US011954788B2

(12) United States Patent
Ghodrat et al.

(10) Patent No.: US 11,954,788 B2
(45) Date of Patent: Apr. 9, 2024

(54) VARIABLE WIDTH BOUNDING VOLUME HIERARCHY NODES

(71) Applicant: Advanced Micro Devices, Inc., Santa Clara, CA (US)

(72) Inventors: Fataneh F. Ghodrat, Boxborough, MA (US); Jeffrey Christopher Allan, Boxborough, MA (US); Skyler Jonathon Saleh, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/564,112

(22) Filed: Dec. 28, 2021

(65) Prior Publication Data
US 2023/0206542 A1 Jun. 29, 2023

(51) Int. Cl.
*G06T 15/06* (2011.01)
*G06T 1/20* (2006.01)
*G06T 15/08* (2011.01)
*G06T 17/10* (2006.01)

(52) U.S. Cl.
CPC ............... *G06T 15/06* (2013.01); *G06T 1/20* (2013.01); *G06T 15/08* (2013.01); *G06T 17/10* (2013.01); *G06T 2210/12* (2013.01); *G06T 2210/21* (2013.01)

(58) Field of Classification Search
CPC .......... G06T 15/06; G06T 1/20; G06T 15/08; G06T 17/10; G06T 2210/12; G06T 2210/21
See application file for complete search history.

(56) References Cited

U.S. PATENT DOCUMENTS

| | | | |
|---|---|---|---|
| 9,035,946 B1 | 5/2015 | Zimmerman | |
| 2005/0179686 A1* | 8/2005 | Christensen | G06T 15/40 345/423 |
| 2009/0219285 A1* | 9/2009 | Reshetov | G06T 15/06 345/420 |
| 2011/0234583 A1* | 9/2011 | Bakalash | G06T 15/06 345/419 |
| 2019/0035139 A1 | 1/2019 | Zimmerman | |
| 2021/0287421 A1 | 9/2021 | Saleh | |
| 2021/0304484 A1 | 9/2021 | Saleh | |
| 2021/0390756 A1 | 12/2021 | Muthler | |

OTHER PUBLICATIONS

Wald, Ray Tracing Deformable Scenes Using Dynamic Bounding, ACM Trans. Graph. 26, 1, Article 6 (Jan. 2007), 18 pages ( Year: 2007).*
Meister, A Survey on Bounding Volume Hierarchies for Ray Tracing, EUROGRAPHICS 2021 vol. 40 (2021), No. 2 STAR—State of The Art Report (Year: 2021).*
Cs248, Lecture 9: Accelerating Geometric Queries—Interactive Computer Graphics Stanford CS248, Winter 2021 (Year: 2021).*

* cited by examiner

*Primary Examiner* — Phuc N Doan
(74) *Attorney, Agent, or Firm* — Volpe Koenig

(57) ABSTRACT

A technique for performing ray tracing operations is provided. The technique includes processing small bounding box nodes in a box intersection test circuit to generate intersection test results for the small bounding box nodes; and processing large bounding box nodes in the box intersection test circuit to generate intersection test results for the large bounding box nodes.

18 Claims, 6 Drawing Sheets

VARIABLE WIDTH BOUNDING VOLUME HIERARCHY NODES

BACKGROUND

Ray tracing is a type of graphics rendering technique in which simulated rays of light are cast to test for object intersection and pixels are colored based on the result of the ray cast. Ray tracing is computationally more expensive than rasterization-based techniques, but produces more physically accurate results. Improvements in ray tracing operations are constantly being made.

BRIEF DESCRIPTION OF THE DRAWINGS

A more detailed understanding may be had from the following description, given by way of example in conjunction with the accompanying drawings wherein.

DETAILED DESCRIPTION

A technique for performing ray tracing operations is provided. The technique includes processing small bounding box nodes in a box intersection test unit to generate intersection test results for the small bounding box nodes; and processing large bounding box nodes in the box intersection test unit to generate intersection test results for the large bounding box nodes.

Figure 1:
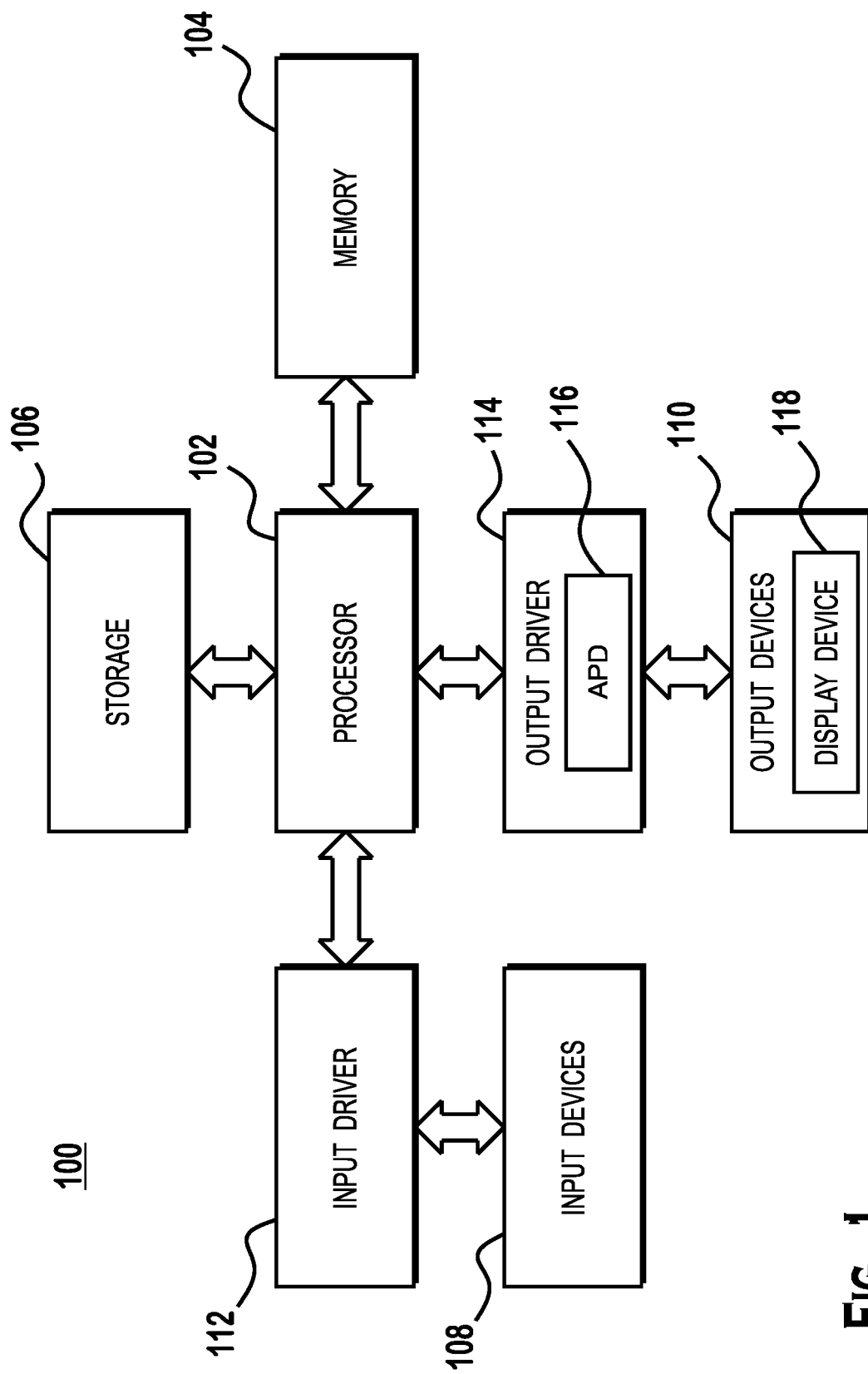
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein. Alternatively, it is contemplated that computing systems that do not perform processing tasks in accordance with a SIMD paradigm performs the functionality described herein.

Figure 2:
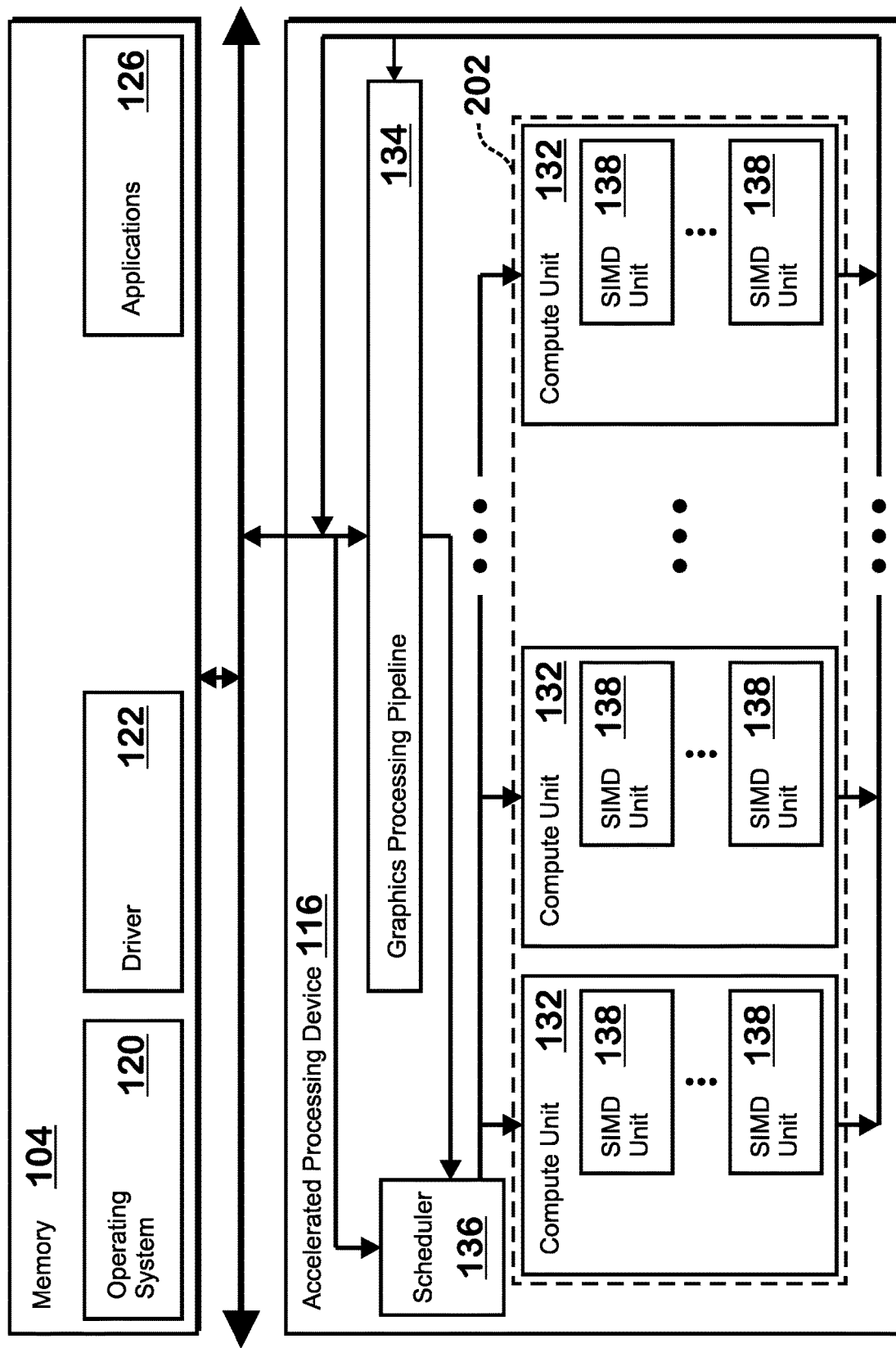
FIG. 2 is a block diagram of the device, illustrating additional details related to execution of processing tasks on the accelerated processing device of FIG. 1, according to an example.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 (together, parallel processing units 202) that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group is executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The compute units 132 implement ray tracing, which is a technique that renders a 3D scene by testing for intersection between simulated light rays and objects in a scene. Much of the work involved in ray tracing is performed by programmable shader programs, executed on the SIMD units 138 in the compute units 132, as described in additional detail below.

Figure 3:
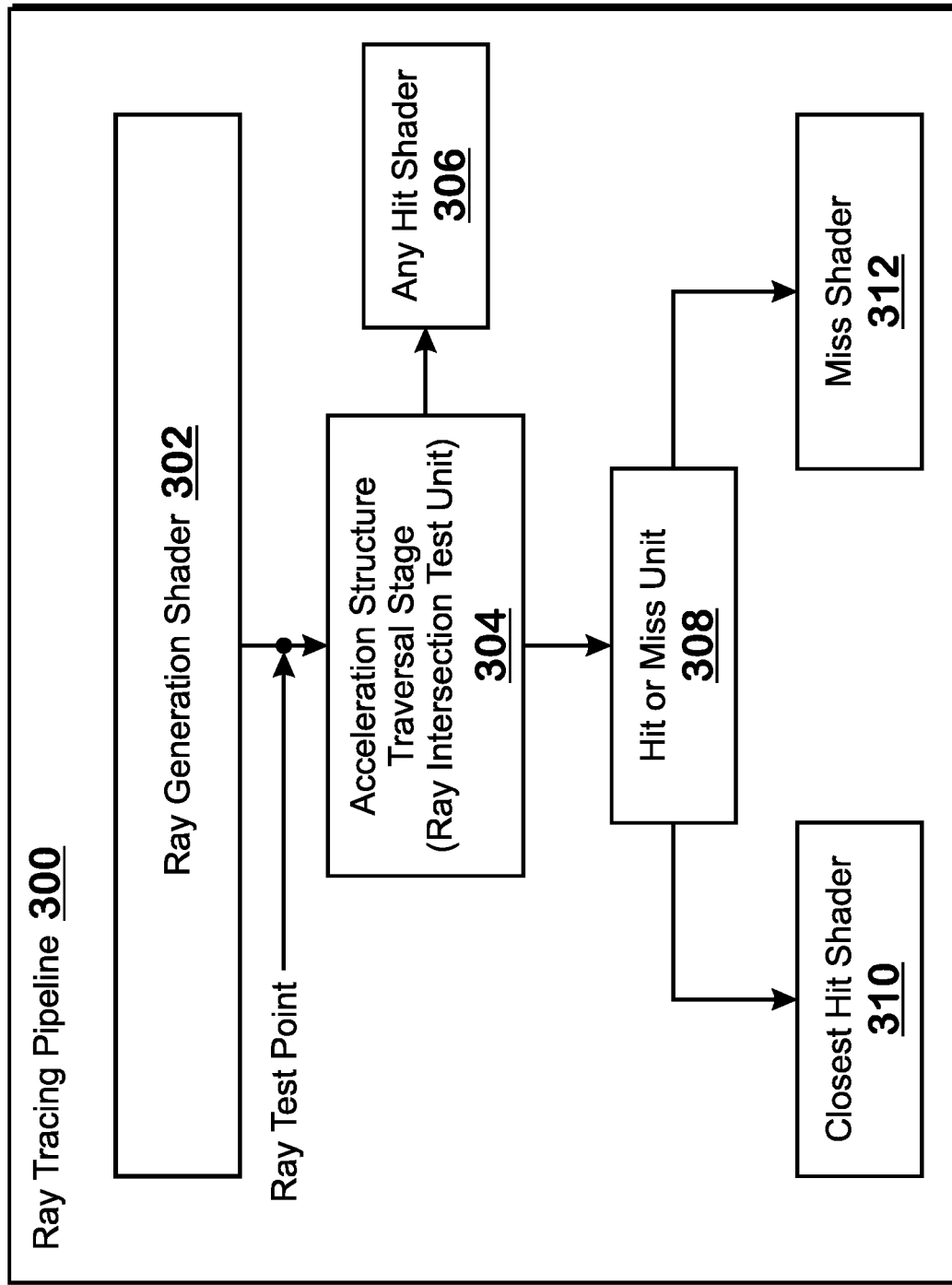
FIG. 3 illustrates a ray tracing pipeline for rendering graphics using a ray tracing technique, according to an example.

FIG. 3 illustrates a ray tracing pipeline 300 for rendering graphics using a ray tracing technique, according to an example. The ray tracing pipeline 300 provides an overview of operations and entities involved in rendering a scene utilizing ray tracing. A ray generation shader 302, any hit shader 306, closest hit shader 310, and miss shader 312 are shader-implemented stages that represent ray tracing pipeline stages whose functionality is performed by shader programs executing in the SIMD unit 138. Any of the specific shader programs at each particular shader-implemented stage are defined by application-provided code (i.e., by code provided by an application developer that is pre-compiled by an application compiler and/or compiled by the driver 122). The acceleration structure traversal stage 304 performs a ray intersection test to determine whether a ray hits a triangle.

The various programmable shader stages (ray generation shader 302, any hit shader 306, closest hit shader 310, miss shader 312) are implemented as shader programs that execute on the SIMD units 138. The acceleration structure traversal stage 304 is implemented in software (e.g., as a shader program executing on the SIMD units 138), in hardware, or as a combination of hardware and software. The hit or miss unit 308 is implemented in any technically feasible manner, such as as part of any of the other units, implemented as a hardware accelerated structure, or implemented as a shader program executing on the SIMD units 138. The ray tracing pipeline 300 may be orchestrated partially or fully in software or partially or fully in hardware, and may be orchestrated by the processor 102, the scheduler 136, by a combination thereof, or partially or fully by any other hardware and/or software unit. The term "ray tracing pipeline processor" used herein refers to a processor executing software to perform the operations of the ray tracing pipeline 300, hardware circuitry hard-wired to perform the operations of the ray tracing pipeline 300, or a combination of hardware and software that together perform the operations of the ray tracing pipeline 300.

The ray tracing pipeline 300 operates in the following manner. A ray generation shader 302 is executed. The ray generation shader 302 sets up data for a ray to test against a triangle and requests the acceleration structure traversal stage 304 test the ray for intersection with triangles.

The acceleration structure traversal stage 304 traverses an acceleration structure, which is a data structure that describes a scene volume and objects (such as triangles) within the scene, and tests the ray against triangles in the scene. In various examples, the acceleration structure is a bounding volume hierarchy. The hit or miss unit 308, which, in some implementations, is part of the acceleration structure traversal stage 304, determines whether the results of the acceleration structure traversal stage 304 (which may include raw data such as barycentric coordinates and a potential time to hit) actually indicates a hit. For triangles that are hit, the ray tracing pipeline 300 triggers execution of an any hit shader 306. Note that multiple triangles can be hit by a single ray. It is not guaranteed that the acceleration structure traversal stage will traverse the acceleration structure in the order from closest-to-ray-origin to farthest-from-ray-origin. The hit or miss unit 308 triggers execution of a closest hit shader 310 for the triangle closest to the origin of the ray that the ray hits, or, if no triangles were hit, triggers a miss shader.

Note, it is possible for the any hit shader 306 to "reject" a hit from the ray intersection test unit 304, and thus the hit or miss unit 308 triggers execution of the miss shader 312 if no hits are found or accepted by the ray intersection test unit 304. An example circumstance in which an any hit shader 306 may "reject" a hit is when at least a portion of a triangle that the ray intersection test unit 304 reports as being hit is fully transparent. Because the ray intersection test unit 304 only tests geometry, and not transparency, the any hit shader 306 that is invoked due to a hit on a triangle having at least some transparency may determine that the reported hit is actually not a hit due to "hitting" on a transparent portion of the triangle. A typical use for the closest hit shader 310 is to color a material based on a texture for the material. A typical use for the miss shader 312 is to color a pixel with a color set by a skybox. It should be understood that the shader programs defined for the closest hit shader 310 and miss shader 312 may implement a wide variety of techniques for coloring pixels and/or performing other operations.

A typical way in which ray generation shaders 302 generate rays is with a technique referred to as backwards ray tracing. In backwards ray tracing, the ray generation shader 302 generates a ray having an origin at the point of the camera. The point at which the ray intersects a plane defined to correspond to the screen defines the pixel on the screen whose color the ray is being used to determine. If the ray hits an object, that pixel is colored based on the closest hit shader 310. If the ray does not hit an object, the pixel is colored based on the miss shader 312. Multiple rays may be cast per pixel, with the final color of the pixel being determined by some combination of the colors determined for each of the rays of the pixel.

It is possible for any of the any hit shader 306, closest hit shader 310, and miss shader 312, to spawn their own rays, which enter the ray tracing pipeline 300 at the ray test point. These rays can be used for any purpose. One common use is to implement environmental lighting or reflections. In an example, when a closest hit shader 310 is invoked, the closest hit shader 310 spawns rays in various directions. For each object, or a light, hit by the spawned rays, the closest hit shader 310 adds the lighting intensity and color to the pixel corresponding to the closest hit shader 310. It should be understood that although some examples of ways in which the various components of the ray tracing pipeline 300 can be used to render a scene have been described, any of a wide variety of techniques may alternatively be used.

As described above, the determination of whether a ray hits an object is referred to herein as a "ray intersection test." The ray intersection test involves shooting a ray from an origin and determining whether the ray hits a triangle and, if so, what distance from the origin the triangle hit is at. For efficiency, the ray tracing test uses a representation of space referred to as a bounding volume hierarchy. This bounding volume hierarchy is the "acceleration structure" described above. In a bounding volume hierarchy, each non-leaf node represents an axis aligned bounding box that bounds the geometry of all children of that node. In an example, the base node represents the maximal extents of an entire region for which the ray intersection test is being performed. In this example, the base node has two children that each represent mutually exclusive axis aligned bounding boxes that subdivide the entire region. Each of those two children has two child nodes that represent axis aligned bounding boxes that subdivide the space of their parents, and so on. Leaf nodes represent a triangle against which a ray test can be performed.

The bounding volume hierarchy data structure allows the number of ray-triangle intersections (which are complex and thus expensive in terms of processing resources) to be reduced as compared with a scenario in which no such data structure were used and therefore all triangles in a scene would have to be tested against the ray. Specifically, if a ray does not intersect a particular bounding box, and that bounding box bounds a large number of triangles, then all triangles in that box can be eliminated from the test. Thus, a ray intersection test is performed as a sequence of tests of the ray against axis-aligned bounding boxes, followed by tests against triangles.

Figure 4:
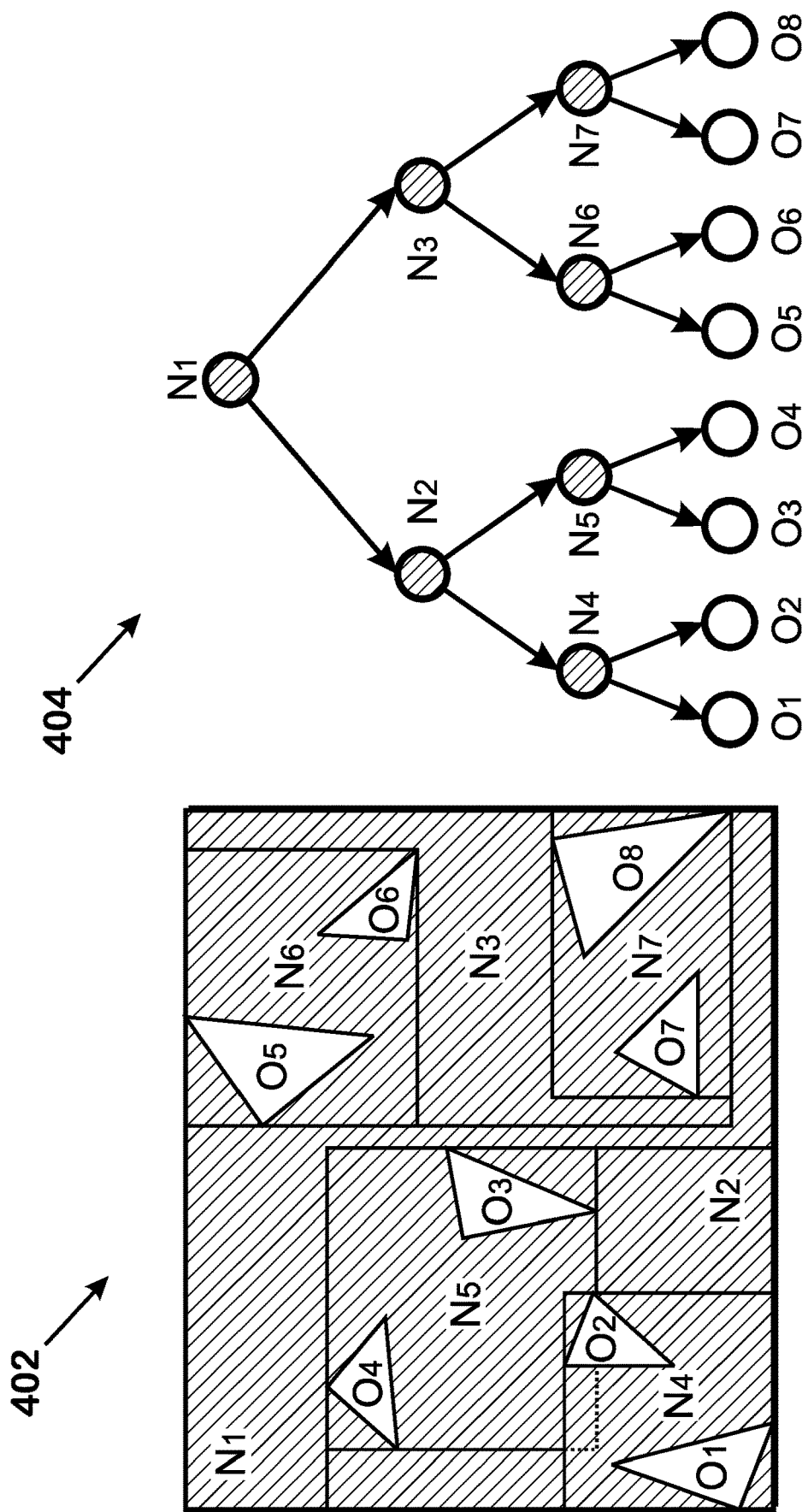
FIG. 4 is an illustration of a bounding volume hierarchy, according to an example.

FIG. 4 is an illustration of a bounding volume hierarchy, according to an example. For simplicity, the hierarchy is shown in 2D. However, extension to 3D is simple, and it should be understood that the tests described herein would generally be performed in three dimensions.

The spatial representation 402 of the bounding volume hierarchy is illustrated in the left side of FIG. 4 and the tree representation 404 of the bounding volume hierarchy is illustrated in the right side of FIG. 4. The non-leaf nodes are represented with the letter "N" and the leaf nodes are represented with the letter "O" in both the spatial representation 402 and the tree representation 404. A ray intersection test would be performed by traversing through the tree 404, and, for each non-leaf node tested, eliminating branches below that node if the box test for that non-leaf node fails. For leaf nodes that are not eliminated, a ray-triangle intersection test is performed to determine whether the ray intersects the triangle at that leaf node.

In an example, the ray intersects $O_5$ but no other triangle. The test would test against $N_1$, determining that that test succeeds. The test would test against $N_2$, determining that the test fails (since $O_5$ is not within $N_1$). The test would eliminate all sub-nodes of $N_2$ and would test against $N_3$, noting that that test succeeds. The test would test $N_6$ and $N_7$, noting that $N_6$ succeeds but $N_7$ fails. The test would test $O_5$ and $O_6$, noting that $O_5$ succeeds but $O_6$ fails Instead of testing 8 triangle tests, two triangle tests ($O_5$ and $O_6$) and five box tests ($N_1$, $N_2$, $N_3$, $N_6$, and $N_7$) are performed.

Figure 5:
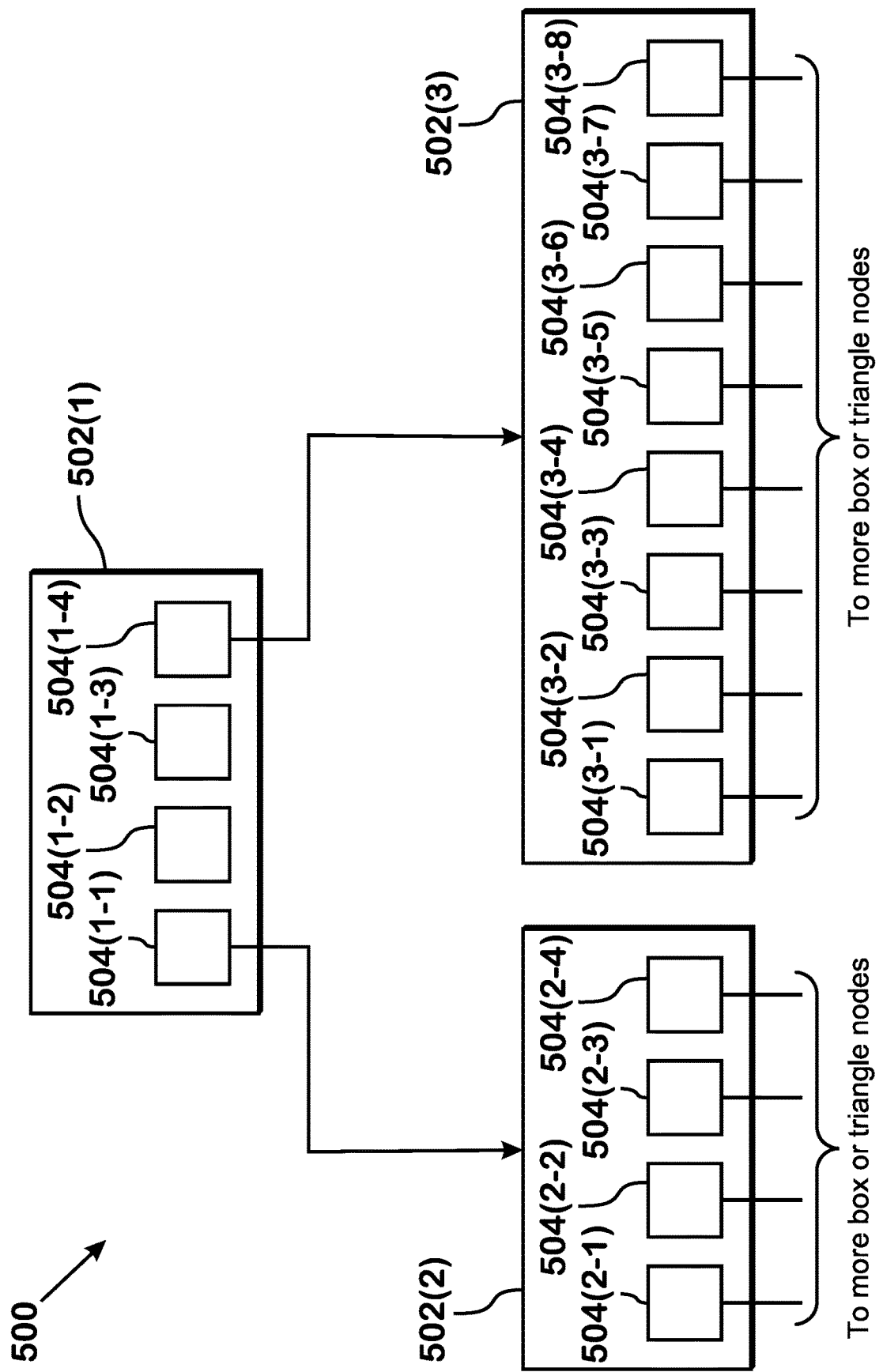
FIG. 5 illustrates an example bounding volume hierarchy including box nodes.

FIG. 5 illustrates an example bounding volume hierarchy 500 including box nodes 502. A node, such as a box node 502, represents a unit of data that includes data for multiple geometry elements (such as bounding boxes). In some implementations, each node has a size defined by a number of bytes. In some examples, a box node 502 has 64 bytes, 128 bytes, or 256 bytes. Some box nodes have the same size as the size of a cache line. A cache line is the size of the unit of data that can be fetched from a cache in a single transaction (e.g., in a single cycle). In other examples, box nodes occupy a portion of a cache line that is less than the entire cache line or span multiple cache lines.

A box node 502 includes box data items 504. The box data items 504 describe bounding boxes, which are similar to the boxes ("N") of FIG. 4. Each box data item 504 includes a description of the geometry of a bounding box (for example, a minimum vertex and a maximum vertex) as well as a pointer to another box node 502 or triangle node (not shown in FIG. 5). The bounding box for a box data item 504 encloses the geometry within the node that the pointer points to. In other words, a box data item 504 for a bounding box points to a node whose geometry fits within that bounding box. A triangle block (not shown) includes data for one or more triangles, which are similar to the triangles ("O") of FIG. 4.

To traverse the illustrated BVH 500, the ray tracing pipeline 300 begins at a box node 502 and tests the ray for intersection with the bounding boxes of the box data items of that box node 502. If an intersection test fails, then the ray tracing pipeline 300 eliminates all children of that box data item 504 from consideration. If the intersection does not fail, then the ray tracing pipeline 300 tests the children of that box data item 504. Some box data items 504 point to box nodes 502 and some box data items 504 point to triangle nodes. In response to the ray tracing pipeline 300 arriving at a triangle node, the ray tracing pipeline 300 performs a ray intersection test to determine whether the ray intersects the one or more triangles of the triangle node. In response to the ray tracing pipeline 300 arriving at a box node, the ray tracing pipeline 300 tests the children of that box node as described above.

It is possible for a bounding volume hierarchy 500 to include box nodes of different types. In one example, a first type of box node has four box data items 504. An example of such a box node is box node 502(1). This type of box node is sometimes referred to herein as a "small box node." The bounding box geometry for the first type of box node bounds the geometry of all four child nodes of that box node. Another type of box bode has eight box data items 504. An example of such a box node is box node 502(3). This type of box node is sometimes referred to herein as a "large box node." The bounding box geometry for the second type of box node bounds the geometry for all eight child nodes of that box node. It should be understood that although a "small box node" is described herein as having four box data items 504, and a "large box node" is described has having eight box data items 504, these numbers are just examples. The small box nodes and large box nodes may have any technically feasible number of box data items. In an example, small box nodes have two box data items 504 and large box nodes have eight box data items 504.

Figure 6:
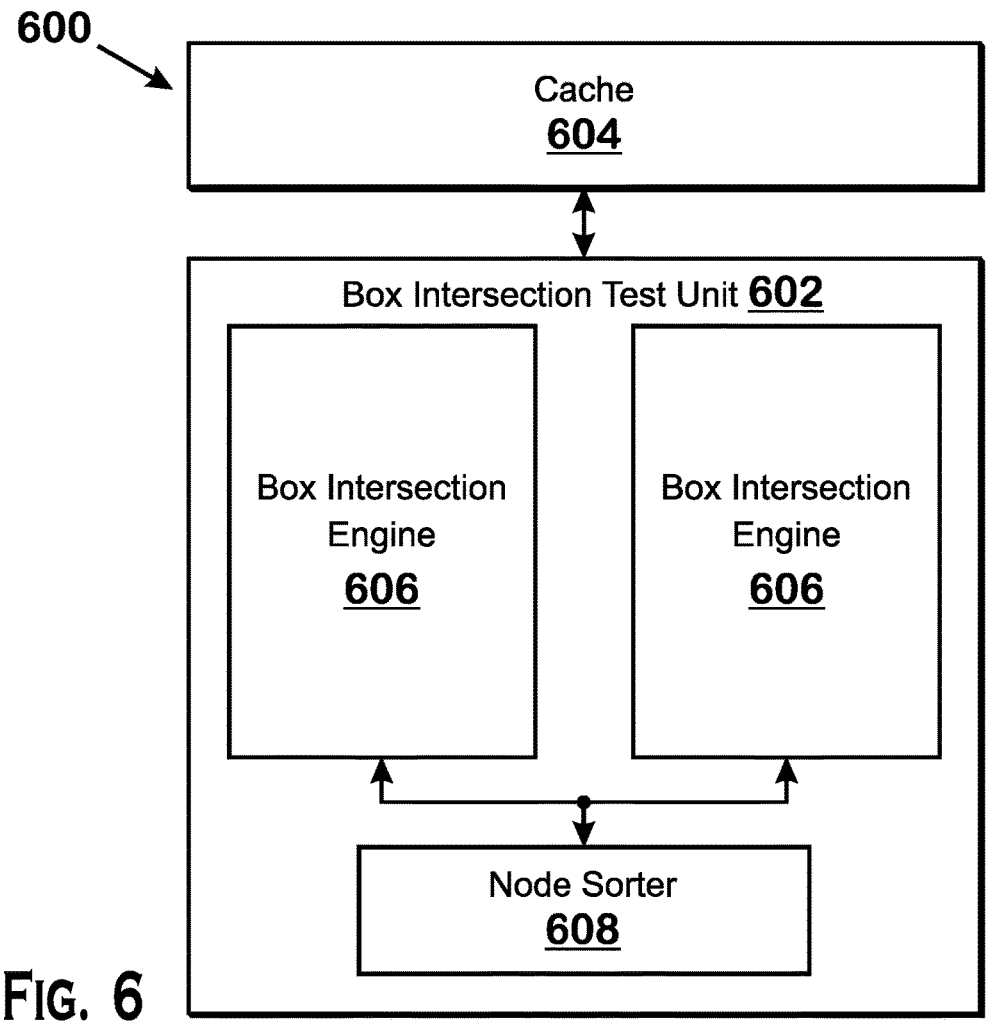
FIG. 6 illustrates a box intersection test system, according to an example.

FIG. 6 illustrates a box intersection test system 600, according to an example. The box intersection test system includes a box intersection test unit 602 and a cache 604. The box intersection test unit includes two box intersection engines 606 and a node sorter 608.

To facilitate high processing speed for the intersection test, each box intersection engine 600 is capable of performing multiple box intersection tests at the same time. In some examples, this number is four. Each such box intersection engine 606 accepts multiple items of bounding box geometry (e.g., from multiple box data items 504) as input, and tests each such item of bounding box geometry against the ray.

The box intersection test unit 602 is capable of operating in two different modes. In one mode, each box intersection engine 606 performs box intersection tests for two small box nodes. In another mode of operation, the box intersection engines 606 cooperate to perform box intersection tests for a large box node. In some examples, the large box nodes are the same size as a cache line. In such examples, a cache line is the size of two small box nodes.

To cooperate to perform the box intersection test for a large box node, one box intersection engine 606 performs a box intersection test for part (such as half or four) of the box data items 504 in the large box node and another box intersection engine 606 performs a box intersection test for the other part (such as half or four) of the box data items 504. In some examples, it is possible to compress box nodes. Thus in such examples, the box intersection test unit 602 decompresses box nodes before use.

The cache 604 operates in different modes depending on whether the box intersection test unit 602 is performing operations for two small nodes or one large node. In some implementations, the large nodes are the size of a cache line and the small nodes are half the size of a cache line. To fetch one large node that is stored in a single cache line the box intersection test unit 602 provides the address of the cache line to the cache 604 and the cache 604 provides the requested cache line in return. In this situation, fetching data from the cache is relatively simple. However, where two small box nodes reside in different cache lines, fetching the data is less straightforward because a single transaction with the cache 604 fetches one cache line. Therefore, to fetch two small nodes that are stored in two different cache lines, the box intersection test unit 602 provides the address for those two different cache lines, along with an indication to the cache 604 of which portions of the cache lines to return. The cache 604 then discards the unwanted portions of the cache lines, combines the requested portions into data having the same size as a cache line, and returns that data to the box intersection test unit 602. The box intersection test unit 602 then provides one of the requested portions to one box intersection engine 606 and another of the requested portions to another box intersection engine 606 to perform the requested box intersection tests.

The node sorter 608 sorts nodes for subsequent testing. More specifically, the order in which bounding boxes are tested against a ray for intersection can impact performance. For example, if it is desired to determine whether any hit occurs, then it could be advantageous to sort the bounding boxes based on the probability with which a hit will occur. Therefore, when a box intersection engine 606 determines that a bounding box for a box node 502 is intersected by a ray, the box intersection engine 606 sorts the box data items 504 within that box node 502 based on sorting criteria. Any sorting criteria can be used. One example is closeness of the box to the origin of the ray being cast. Boxes that are closer to the origin are tested before boxes that are farther from the origin.

As a result of the sort, the box intersection test unit 602 subsequently tests the bounding boxes according to that order. As described above, some box data items 504 point to box nodes 502 (for example, box data item 504(1-1) of box node 502(1) points to box node 502(2)). Each such box node 502 can thus be processed by providing the corresponding bounding boxes for the box data items 504 to the box intersection test unit 602. In an example, each of the box data items 504 of box node 502(2) points to another box node 502, each of which includes a certain number of box data items 504, each of which is associated with a bounding box. If those box data items 504 were sorted as 504(2-1), 504(2-2), 504(2-3), 504(2-4), then the box intersection test unit 602 would test the bounding boxes in the box node 502 pointed to by box data item 504(2-1), then the bounding boxes in the box node 502 pointed to by box data item 504(2-2), and so on. Put differently, the sorting defines the order in which box nodes are processed by the box intersection test unit 602, where processing a box node includes testing all of the child nodes of that box node.

As stated above, the box intersection test unit 602 is capable of operating in one mode (the "large box node mode") in which both box intersection engines 606 cooperate to process a single large box node (e.g., box node 502(3)) and in another mode (the "small box node mode") in which each box intersection engine 606 processes a different small box node (e.g., box node 502(2)). The node sorter 608 operates differently depending on which mode the box intersection test unit 602 is in. In the event that the box intersection test unit 602 is operating in the large box node mode, the node sorter 608 sorts the boxes across both box intersection engines 606. In the event that the box intersection test unit 602 is operating in the small box node mode, the node sorter 608 sorts the boxes individually for each box intersection engine 606. More specifically, the box intersection engines 606 test each box data item 504 of a box node for intersection with a ray. The node sorter 608 sorts each box data item 504 that is determined to intersect the ray, to define the subsequent order in which the associated box nodes 502 are tested. Sorting for a small box node—sorting "individually for each box intersection engine 606"—means that the node sorter 608 sorts the box data items 504 output by each box intersection engine 606 individually. Each box data item 504 output by a box intersection engine is sorted with respect to each other, but not with respect to the box data items 504 output by another box intersection engine 606. Sorting for a large box node—"across both box intersection engines 606"—means that each box data item 504 is sorted with respect to all box data items 504 output by the box intersection engines 606 that are processing the large box node. Thus in the small box mode, the box data items 504 are sorted for each small box node, and in the large box mode, the box data items 504 are sorted for the large box node.

In some implementations, it is possible for software to control which mode the node sorter 608 operates in. More specifically, software, such as software executing on the processor 102, as a shader program in a compute unit 132, as a program in the scheduler 136, or as software executing in any other processor, can request the node sorter 608 operate in either the small box mode or the large box mode. In response to that request, the node sorter 608 would operate in the requested mode.

Figure 7:
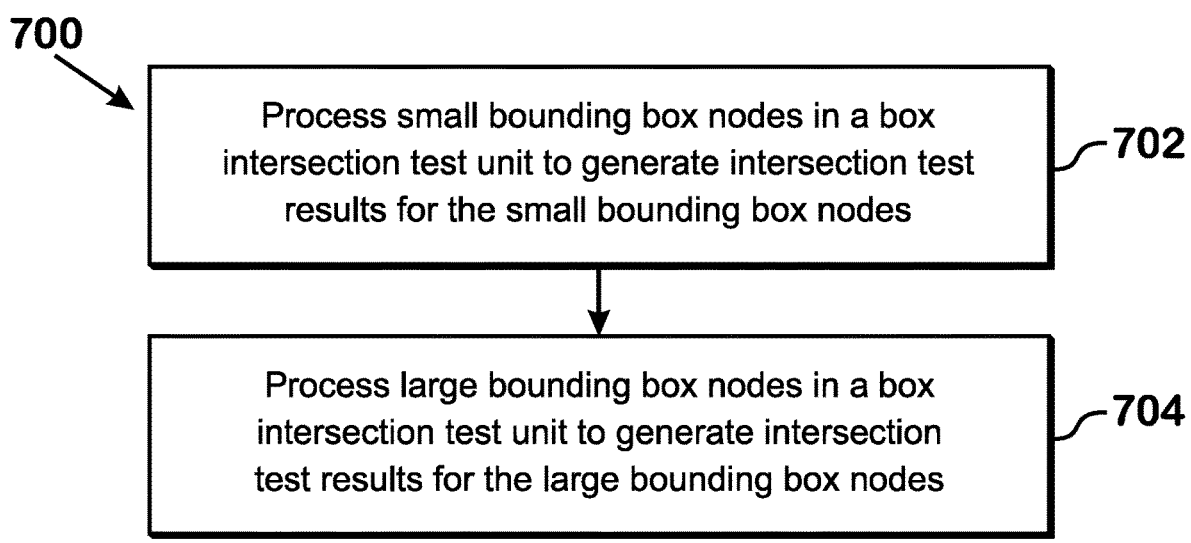
FIG. 7 is a flow diagram of a method for performing ray tracing operations, according to an example.

FIG. 7 is a flow diagram of a method 700 for performing ray tracing operations, according to an example. Although described with respect to the system of FIGS. 1-6, those of skill in the art will understand that any system configured to perform the steps of the method 700 in any technically feasible order falls within the scope of the present disclosure.

At step 702, a box intersection test unit 602 processes small bounding box nodes to generate intersection test results for the small bounding box nodes. Processing the small bounding box nodes includes determining whether a ray intersects the bounding boxes defined by the box data items 504 of the small bounding box nodes 502. As described elsewhere herein (such as with respect to FIG. 4), a ray is tested for intersection with geometry of a scene by traversing an acceleration structure such as the bounding volume hierarchy 404 of FIG. 4. An acceleration structure traversal stage 304 tests the ray against various nodes, such as box nodes and triangle nodes, of the bounding volume hierarchy. A failed test against a box node results in the acceleration structure traversal stage 304 removing children of that box node from consideration. The results generated include an indication of whether a ray intersections the bounding box for one or more box data items 504 of the small box node. At step 704, the box intersection test unit 602 processes large bounding box nodes to generate test results for the large bounding box nodes. Processing the large bounding box nodes is similar to processing the small bounding box nodes except that each large bounding box node has more bounding box data items 504.

The box intersection engines 606 are capable of performing multiple tests for intersection between a ray and bounding boxes. This capability is generally used by providing the box data items 504 of a small box node to a box intersection engine 606 or by providing the box data items 504 of a large box node to multiple box intersection engines 606. In some examples, each box intersection engine 606 is capable of testing a ray against four boxes. In such examples, a small node has four box data items 504 and a large node has eight box data items 504.

In some implementations, each box intersection engine 606 is capable of testing multiple bounding boxes (e.g., four bounding boxes) per cycle. Thus in some implementations, the box intersection test unit 602 is capable of testing a larger number of small nodes per cycle than large nodes per cycle. In an example, the box intersection test unit 602 is capable of testing twice as many small nodes as large nodes per unit of time (e.g., per clock cycle).

In addition to testing the ray against bounding boxes, the bounding box test unit also sorts the results of such test according to a sort criteria. As described elsewhere herein, the sorting can occur either independently for each box intersection engine 606 or across the box intersection engines 606. Sorting independently for each box intersection engine 606 is generally associated with processing the small bounding box nodes, since different bounding box nodes will be processed in each box intersection engine 606. Sorting across box intersection engines 606 is generally associated with processing a large bounding box node, since those nodes are processed in multiple box intersection engines 606. In some examples, software controls which of these modes the box intersection test unit 602 will operate in.

As described elsewhere herein, in some implementations, the cache is configured to accommodate the two different bounding box testing modes. Specifically, in the large node mode of operation, the size of a large node is the size of a cache line and small nodes have half of that size. For the large node, one cache line is fetched. For small nodes, two cache lines are fetched and the unneeded portions of the cache lines are discarded.

Note that although the present disclosure sometimes refers to triangles as being in the leaf nodes of the bounding volume hierarchy, any other geometric shape could alternatively be used in the leaf nodes. In such instances, compressed triangle blocks include two or more such primitives that share at least one vertex.

Each of the units illustrated in the figures represent hardware circuitry configured to perform the operations described herein, software configured to perform the operations described herein, or a combination of software and hardware configured to perform the steps described herein. For example, the ray tracing pipeline 300, ray generation shader 302, any hit shader 306, hit or miss unit 308, miss shader 312, closest hit shader 310, and acceleration structure traversal stage 304 are implemented fully in hardware, fully in software executing on processing units (such as compute units 132), or as a combination thereof. In some examples, the acceleration structure traversal stage 304 is partially implemented as hardware and partially as software. In some examples, the portion of the acceleration structure traversal stage 304 that traverses the bounding volume hierarchy is software executing on a processor and the portion of the acceleration structure traversal stage 304 that performs the ray-box intersection tests and ray-triangle intersection tests is implemented in hardware. The box intersection test unit 602, including the box intersection engine 606 and the node sorter 608 is implemented as circuitry, as software as executing on a processor, or as a combination thereof.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing ray tracing operations, the method comprising:
   processing two small bounding box nodes in two different box intersection engines of a box intersection test circuit to generate first intersection test results, wherein each of the small bounding box nodes includes a first number of box data items; and
   processing large bounding box nodes in the two different box intersection engines of the box intersection test circuit to generate second intersection test results, wherein each of the large bounding box nodes includes a second number of box data items,
   wherein the first number of box data items is smaller than the second number of box data items.

2. The method of claim 1, wherein the box data items specify information for bounding box geometry.

3. The method of claim 1, further comprising:
   for the two small bounding box nodes, individually sorting the first intersection test results output from the two different box intersection engines; and
   for the large bounding box nodes, sorting the second intersection test results across output of the two different box intersection engines.

4. The method of claim 1, further comprising:
   specifying, via software, whether to sort the first intersection test results and the second intersection test results separately or together.

5. The method of claim 1, wherein the processing for the two small bounding box nodes generates results for twice as many small bounding box nodes as large bounding box nodes in a unit of time.

6. The method of claim 1, further comprising fetching the two small bounding box nodes from a cache by fetching two cache lines and discarding unused portions of the cache lines.

7. The method of claim 1, further comprising fetching the large bounding box nodes from a cache by fetching a cache line as the large bounding box node.

8. The method of claim 1, wherein processing the two small bounding box nodes and processing the large bounding box nodes occur as part of a traversal through a bounding volume hierarchy.

9. A system for performing ray tracing operations, the system comprising:
   a memory; and
   a box intersection test circuit, configured to:
   process two small bounding box nodes in two different box intersection engines of the box intersection test circuit to generate first intersection test results, wherein each of the small bounding box nodes includes a first number of box data items; and
   process large bounding box nodes in the two different box intersection engines to generate second intersection test results, wherein each of the large bounding box nodes includes a second number of box data items,
   wherein the first number of box data items is smaller than the second number of box data items.

10. The system of claim 9, wherein the box data items specify information for bounding box geometry.

11. The system of claim 9, wherein the box intersection test circuit is further configured to:
    for the two small bounding box nodes, individually sort the first intersection test results output from the two different box intersection engines; and
    for the large bounding box nodes, sort the second intersection test results across output of the two different box intersection engines.

12. The system of claim 9, wherein the box intersection test circuit is further configured to:
    specify, via software, whether to sort the first intersection test results and the second intersection test results separately or together.

13. The system of claim 9, wherein the processing for the two small bounding box nodes generates results for twice as many small bounding box nodes as large bounding box nodes in a unit of time.

14. The system of claim 9, wherein the box intersection test circuit is further configured to fetch the two small bounding box nodes from a cache by fetching two cache lines and discarding unused portions of the cache lines.

15. The system of claim 9, wherein the box intersection test circuit is further configured to fetch the large bounding box nodes from a cache by fetching a cache line as the large bounding box node.

16. The system of claim 9, wherein the two small bounding box nodes and the large bounding box nodes are processed as part of a traversal through a bounding volume hierarchy.

17. A system comprising:
a memory; and
a ray tracing pipeline including a box intersection test circuit, configured to:
process two small bounding box nodes in two different box intersection engines of the box intersection test circuit to generate first intersection test results, wherein each of the small bounding box nodes includes a first number of box data items; and
process large bounding box nodes in the two different box intersection engines of the box intersection test circuit to generate second intersection test results wherein each of the large bounding box nodes includes a second number of box data items,
wherein the first number of box data items is smaller than the second number of box data items.

18. The system of claim 17, the box data items specify information for bounding box geometry.

* * * * *